(12) United States Patent
Liang

(10) Patent No.: US 6,826,636 B2
(45) Date of Patent: Nov. 30, 2004

(54) METHOD AND ARCHITECTURE CAPABLE OF PROGRAMMING AND CONTROLLING ACCESS DATA AND INSTRUCTIONS

(75) Inventor: Bor-Sung Liang, Kaohsiung (TW)

(73) Assignee: Sunplus Technology Co., Ltd., Hsin-chu (TW)

( * ) Notice: Subject to any disclaimer, the term of this patent is extended or adjusted under 35 U.S.C. 154(b) by 0 days.

(21) Appl. No.: 10/418,221

(22) Filed: Apr. 18, 2003

(65) Prior Publication Data

US 2004/0049615 A1 Mar. 11, 2004

(30) Foreign Application Priority Data

Sep. 11, 2002 (TW) .......................... 91120693 A

(51) Int. Cl.[7] .................. G06F 13/10; G06F 13/28
(52) U.S. Cl. .................. 710/35; 710/33; 712/225
(58) Field of Search ................ 710/8, 22, 25, 710/33–35; 711/167–169, 118, 119, 122, 137; 712/225

(56) References Cited

U.S. PATENT DOCUMENTS

| 6,131,145 | A | * | 10/2000 | Matsubara et al. ......... 711/137 |
| 6,185,637 | B1 | * | 2/2001 | Strongin et al. ............ 710/35 |
| 6,266,723 | B1 | * | 7/2001 | Ghodrat et al. ............ 710/100 |
| 6,704,833 | B2 | * | 3/2004 | Huck ........................... 711/3 |
| 2004/0039878 | A1 | * | 2/2004 | van de Waerdt ........... 711/137 |

* cited by examiner

Primary Examiner—Ilwoo Park
(74) Attorney, Agent, or Firm—Bacon & Thomas, PLLC

(57) ABSTRACT

A method and an architecture capable of programming and controlling access of data and instructions are provided. There are provided a plurality of data transfer levels, in which a current data transfer level is used for accessing data and instructions from an external memory. Each data transfer level corresponds to a length of a continuous data transfer via an interface between the memory and a high-speed access device. The current data transfer level is dynamically adjusted based on data format accessed by a processor kernel or a result of instruction decoding performed by the processor kernel.

14 Claims, 7 Drawing Sheets

METHOD AND ARCHITECTURE CAPABLE OF PROGRAMMING AND CONTROLLING ACCESS DATA AND INSTRUCTIONS

BACKGROUND OF THE INVENTION

1. Field of the Invention

The present invention relates to data and instruction access in a computer system and, more particularly, to a method and an architecture capable of programming and controlling access of data and instructions.

2. Description of Related Art

The processing speed of CPU of a modem computer has increased significantly. Furthermore, such trend of increase is still continuing. It is known that a corresponding increase in accessing memory is required for increasing the total data and/or instruction access efficiency of the computer. In other words, a relatively slow memory is a bottleneck of the efficiency increase of the computer. For solving this problem, a cache memory is thus developed, in which a memory access unit is defined to have a constant length composed of a predetermined number of instructions or data, and such unit is called a cache line. The length of the unit is critical. For example, in a memory having a burst transfer capability, multiple data accesses can be performed by only giving one address and associated setting, so that a data string having the assigned burst length is continuously transferred. As a result, an initial delay prior to data transfer is decreased. In such memory, the length of the cache line is related to the burst length.

With reference to FIG. 1, it presents schematically a conventional processor architecture having the above cache capability. As shown, in case that a cache line having the required data or instructions is in the cache module 11a, the processor kernel 14 can fetch required data or instructions from a cache module 11 directly with no or very low time delay. However, if the required data or instructions are not in the cache module 11, a cache miss is encountered. At this moment, the processor kernel 14 has to command the cache module 11 to read the required data or instructions from a memory device 13. Such an operation is called cache refill. Thus, a significant system delay (called cache miss penalty) is occurred since all cache lines have to be stored in the cache module 11.

The cache miss penalty often occurs continuously when the processor kernel 14 accesses a certain section of program codes or data section at the first time. This can adversely affect the performance of the computer system. For solving this problem, a prefetching is proposed. As shown in FIG. 2, a prefetch module 12 is provided between the cache module 11 and the memory device 13. The prefetch module 12 acts to predict possible sections of program codes or data sections to be used next by the processor kernel 14 and read the same into the prefetch module 12. Once the processor kernel 14 finds that it is unable to get required data or instructions from the cache module 11 (i.e., a cache miss occurred), the prefetch module 12 is checked to search the data or instructions. If the required data or instructions are already in the prefetch module 12, a successful access is then realized, and the required cache lines are stored in the cache module 11 by reading the same from the prefetch module 12. As a result, the cache miss penalty is greatly reduced. However, a prefetch miss still may occur if the required data or instructions are not in the prefetch module 12. It is still required to get the required cache lines from the external memory device 13. Thus, a significant system delay (called prefetch miss penalty) is occurred.

Conventionally, the architecture of the prefetch module 12 is configured to be the same as the cache module, and thus the cache line is employed as the data length of the prefetch module 12. In other words, the length of a burst transfer in a dynamic random access memory (DRAM) is taken as a data transfer unit. However, the interface either between the prefetch module 12 and the cache module 11 or between the pre-fetch module 11 and the processor kernel 14 is not a DRAM interface. Hence, it is not necessary to take the cache line as a data transfer unit. Practically, data transfer rate may be significantly lowered if the cache line is used as the data transfer unit.

Specifically, three interfaces are provided in the processor structure with cache module 11 and prefetch module 12. The first interface 15 is an external interface between the prefetch module 12 and the external memory device 13. The second interface 16 is provided between the prefetch module 12 and the cache module 11. The third interface 17 is provided between the cache module 11 and the processor kernel 14 for transferring data/instruction from the cache module 11 to the processor kernel 14. Conventionally, data transfer unit taken in each of the first and the second interfaces 15 and 16 is the same as the data length of the cache line. As for data access via the third interface 17, if it is related to data access of either first or second interface, the data access can be performed only after the cache line has been accessed. However, the data length of the cache line is not an optimum data transfer unit between the prefetch module 12 and any one of the memory device 13, the cache module 11, and the processor kernel 14. This is because a length of the cache line is related to structure of the cache module 11. Theoretically, the length of the cache line is fixed during the working cycles of the processor kernel 14. However, the processor kernel 14 is dynamic in accessing data/instruction when being executed. Hence, an optimum performance of the processor kernel 14 is not obtained if the cache line having the fixed length is taken as the data transfer unit. As a result, resources are wasted.

For example, several problems have been found when a cache line having a fixed length is taken as a data transfer unit as follows:

(1) In the process of data transfer via the interface, it can be known that a long data string is about to be accessed and data length thereof is longer than a data length of the current cache line. However, the data length of the cache line is fixed, resulting in an inhibition of longer burst length setting, an inhibition of reduction of times of initial delay, and time consuming.

(2) In the process of data transfer via the interface, it can be known that a short data string is about to be accessed and data length thereof is shorter than the data length of the current cache line. However, as stated above, the data length of the cache line is fixed. As a result, it is still required to access data by taking the length of the cache line as an access unit and thus unnecessary data is accessed, resulting in a waste of limited resources.

SUMMARY OF THE INVENTION

The object of the present invention is to provide a method and an architecture capable of programming and controlling access of data and instructions, so as to control a continuous data transfer mode based on instruction or data format, thereby effecting an optimum performance of data transfer and greatly reducing a possibility of transferring unnecessary data.

In one aspect of the present invention, there is provided an architecture capable of programming and controlling access of data and instructions, in which a plurality of data transfer levels are preset and a current data transfer level is used for accessing data and instructions. The architecture comprises: a first module capable of effecting a burst transfer for continuously outputting a data string having a fixed burst length for access; a second module for storing data and instructions, wherein each data transfer level corresponds to a length of a continuous data transfer via an interface between the first and the second modules; and a burst mode controller programmed by data format accessed by the first module or a result of instruction decoding performed by the first module, so as to adjust the current data transfer level.

In another aspect of the present invention, there is provided an architecture capable of programming and controlling access of data and instructions, in which a plurality of data transfer levels are preset and a current data transfer level is used for accessing data and instructions. The architecture comprises: a first module capable of effecting a burst transfer for continuously outputting a data string having a fixed burst length for access; a second module controlled by the first module for accessing data and instructions; a third module controlled by the first module for accessing data and instructions, wherein each data transfer level corresponds to a length of a continuous data transfer via an interface between the second and the third modules; and a burst mode controller programmed by data format accessed by the first module or a result of instruction decoding performed by the first module, so as to adjust the current data transfer level.

In still another aspect of the present invention, there is provided a method capable of programming and controlling access of data and instructions for transferring data and instructions between a first module and a second module. The method comprises the steps of: (A) defining a plurality of data transfer levels for allowing the first module to access data and instructions from the second module by a current data transfer level; and (B) adjusting the current data transfer level based on data format accessed by the first module or a result of instruction decoding performed by the first module.

In a further aspect of the present invention, there is provided a method capable of programming and controlling access of data and instructions for allowing a first module to control transfer of data and instructions between a second module and a third module. The method comprises the steps of: (A) defining a plurality of data transfer levels for transferring data and instructions between the second and the third modules by a current data transfer level; and (B) adjusting the current data transfer level based on data format accessed by the first module or a result of instruction decoding performed by the first module.

Other objects, advantages, and novel features of the invention will become more apparent from the detailed description when taken in conjunction with the accompanying drawings.

DETAILED DESCRIPTION OF THE PREFERRED EMBODIMENT

Figure 1:
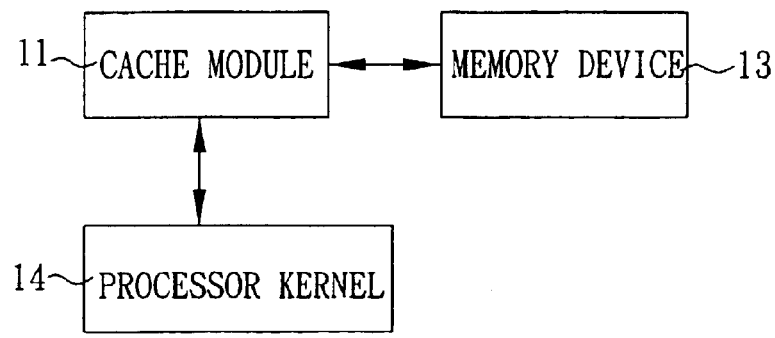
FIG. 1 presents schematically a conventional processor architecture having the cache capability.
Figure 2:
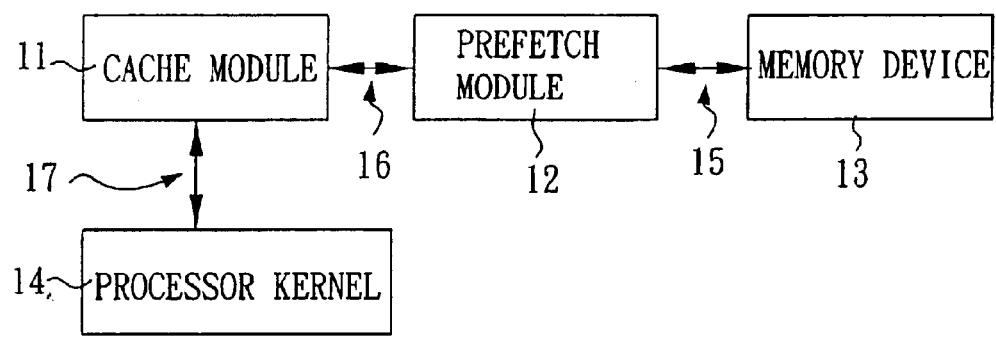
FIG. 2 presents schematically another conventional processor architecture having the cache capability.
Figure 3:
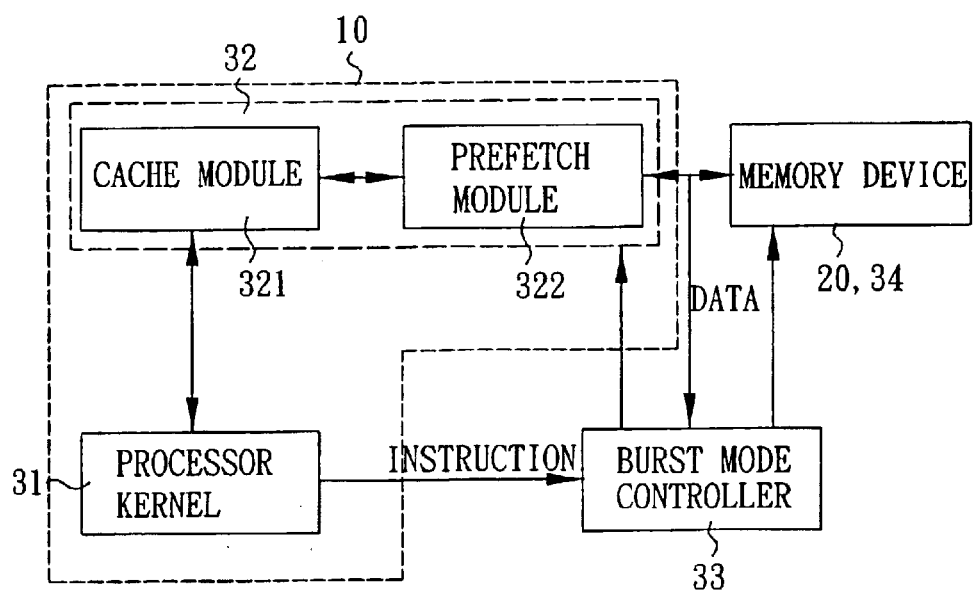
FIG. 3 presents schematically a first preferred embodiment of the architecture capable of programming and controlling access of data and instructions according to the invention.

With reference to FIG. 3, there is shown an architecture capable of programming and controlling access of data and instructions in accordance with the present invention, which includes a burst mode controller 33 disposed between a first module 10 and a second module 20 in a computer system for controlling data transfer therebetween. The first module 10 can be implemented as a processor, a digital signal processor (DSP), a direct memory access (DMA) master, a bus master, a specific operation module, or an audio-video (AV) processing module. The second module 20 can be implemented as a memory, a DMA slave, a bus slave, a HD/CD/DVD device, or a network device. In this embodiment, the first module 10 is a processor architecture and comprises a processor kernel 31 and a high-speed access device 32. The second module 20 is an external memory device 34, such as DRAM. The high-speed access device 32 acts to store a portion of data and instructions sent from the memory device 34. The stored portion of data and instructions in the high-speed access device 32 is available for the processor kernel 31 to access at a high speed. The high-speed access device 32 can be implemented as a cache module or a temporary memory. In this embodiment, the high-speed access device 32 is comprised of a cache module 321 and a prefetch module 322. The processor kernel 31 has the capability of burst transfer for continuously outputting a data string having a fixed burst length for access.

The burst mode controller 33 acts to control a continuous data transfer mode based on either data format or a result of instruction decoding performed by the processor kernel 31. As such, it is possible of dynamically adjusting a data transfer mode via an interface between the prefetch module 322 and the memory device 34, and adjusting data amount accessed via an interface between the prefetch module 322 and the cache module 321 in running the computer system. As a result, a high efficient data/instruction access is obtained. Further, a plurality of data transfer levels are provided. Each data transfer level corresponds to the length of a continuous data transfer via the interface either between the prefetch module 322 and the memory device 34 or between the prefetch module 322 and the cache module 321. For example, data transfer levels 0 to N correspond to $2^0$ to $2^N$ length units of the continuous data transfer respectively.

Figure 4:
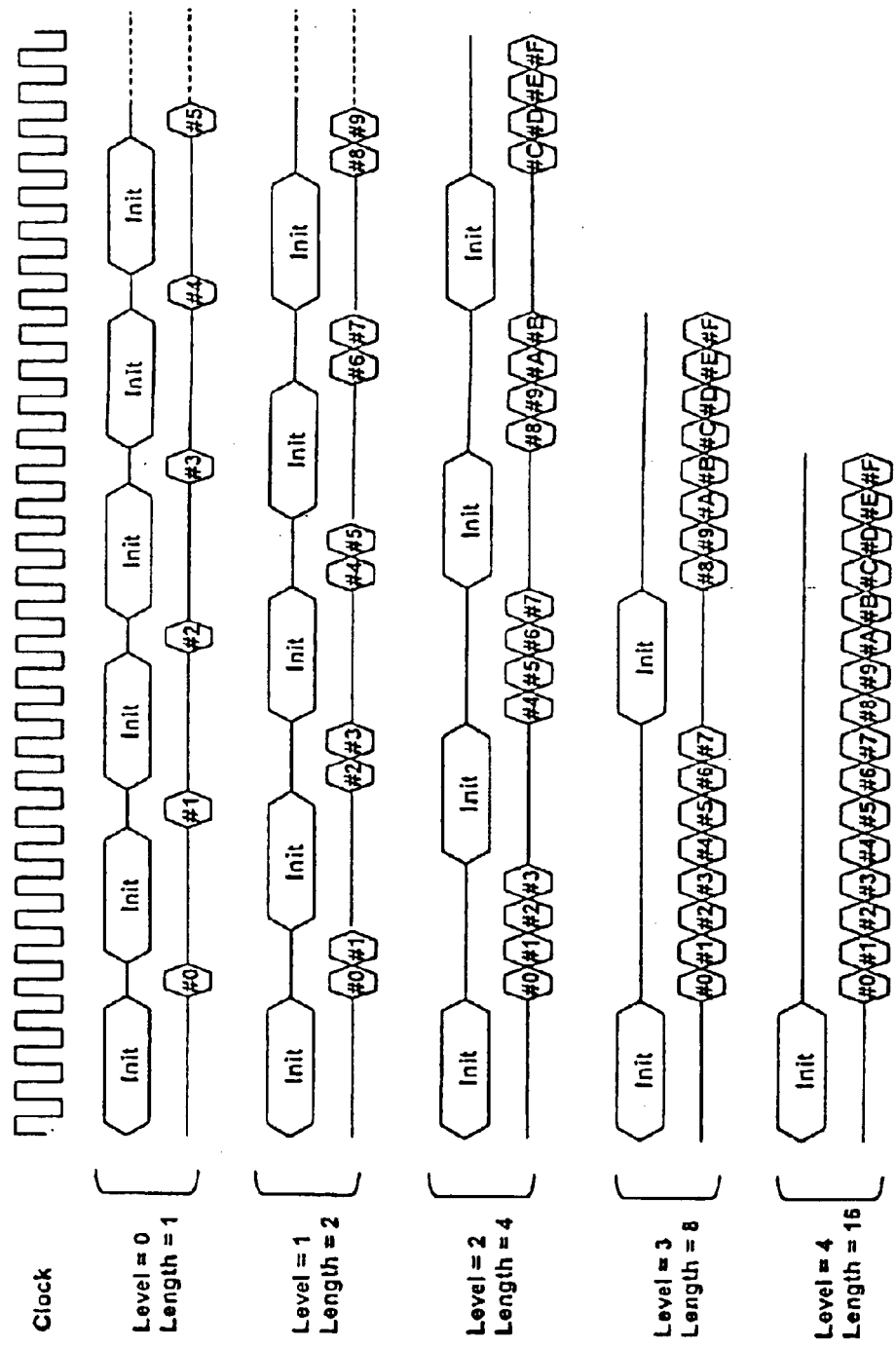
FIG. 4 is a timing diagram of data access using various data transfer levels according to the invention.

For ease of explanation, there are five data transfer modes, i.e., 0, 1, 2, 3 and 4, performed on the interface of the memory device 34, each representing a length of 1, 2, 4, 8 and 16 of continuous data transfer. A higher level represents a data transfer mode having a larger number of continuous data units being transferred. With reference to FIG. 4, there are illustrated five levels in the continuous data transfer modes. As shown, a data transfer mode having a larger number of continuous data units (or instructions) being transferred has fewer number of initial delays ("Inits") during the same number of clocks; i.e., more data/instructions are transferred per predetermined number of clocks therein. However, if only a small amount of data is required, remaining portion of the transferred data units/instructions other than the required small portion thereof is redundant (i.e., unnecessary). In view of this, preferably, higher levels are adapted to perform operations on longer data strings of the same characteristics, such as digital signal processing (DSP), data searching, data relocation, and image processing, while lower levels are adapted to access random data or program codes having a large number of jump commands.

With reference to FIG. 3 again, the burst mode controller 33 is programmed based on information contained in data/instruction for switching the data transfer level. For example, in a case that the burst mode controller 33 is programmed based on information embedded in an instruction, such information is given by setting a specific instruction, embedded in the instruction field, or implied in certain operation codes (OP codes). When the processor kernel 31 decodes the instruction to obtain the information, it is able to notify the burst mode controller 33 of programming a data transfer mode. For example, the data transfer mode is either fixed at a certain level or adapted to increase or decrease a level.

Figure 5:
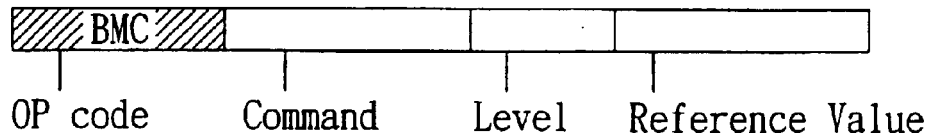
FIGS. 5, 6, and 7 are schematic diagrams of first, second, and third instruction formats implemented in burst mode controller according to the invention respectively.

There are three approaches employed for programming the burst mode controller 33 based on information embedded in the instruction as follows:

(1) One or more types of instruction of the processor kernel 31 is particularly assigned for sending information to the burst mode controller 33. As shown in FIG. 5, BMC is a mnemonic of OP code of such an instruction. When the processor kernel decodes an instruction and finds that the OP code is BMC, it indicates that this instruction is a transfer mode control instruction. As shown, there are three fields in the instruction, namely, a "Command" field for storing a command code of the burst mode controller 33, a "Level" field for storing numeral of a specific level, and a "Reference Value" field for storing numeral associated with the command code. For example, Level=3, Command=auto_level_return, and Reference Value=16 means that the burst mode controller 33 is programmed to switch the data transfer level to 3 and return to the original level after a data transfer of 16 burst length units.

Figure 6:
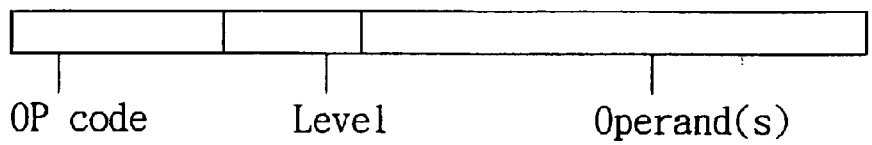

(2) A field is particularly assigned in each instruction of the processor kernel 31 to store a control indication of the burst mode controller 33. As illustrated in FIG. 6, numeral of a specific level is stored in a level field for indicating an appropriate level of the burst mode controller 33.

Figure 7:
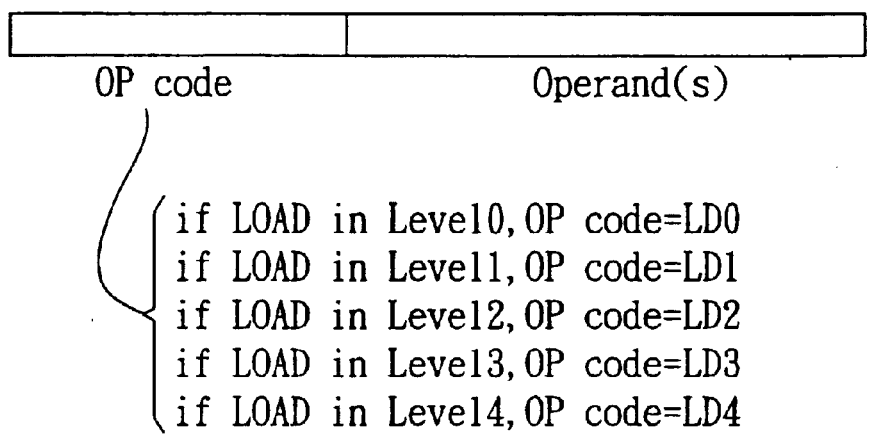

(3) In defining the OP codes of the processor kernel, the OP codes related to access instructions are embedded with control instructions of the burst mode controller 33. As illustrated in FIG. 7, an instruction LOAD has five types of OP code, i.e., LD0 to LD4 in which different OP codes indicate different data transfer levels.

In order to program the burst mode controller 33 based on information embedded in data, a detection is made on information contained in the accessed data. The obtained information is in turn sent to the burst mode controller 33 for programming a data transfer mode. For example, the data transfer mode is either fixed at a certain level or adapted to increase or decrease a level.

There are two approaches employed for programming the burst mode controller 33 based on information embedded in data as follows:

(1) Address determination: A number of address segments are predefined. Also, a data transfer level is assigned to each address segment. The burst mode controller 33 determines to enter which level based on the address segment of data to be accessed. For example, a program needs to process a longer string of image data addressed at 0x4000–0x4FFF. Further, a storage space is required to store scattered dynamic data strings each consisting of four bytes addressed at 0x0200–0x02FF. At this time, in the burst mode controller 33, a region addressed at 0x4400–0x4FFF is assigned to Level=4 and a region addressed at 0x0200–0x02FF is assigned to Level=2, respectively. When there is a need to access image data for processing, the burst mode controller 33 will detect the region assigned to Level=4. As a result, the data transfer level is increased automatically for increasing data transfer efficiency. When there is a need to access scattered data strings for processing, the burst mode controller 33 will detect the region assigned to Level=2. As a result, the data transfer level is decreased to such a level automatically for avoiding an access of unnecessary data.

(2) Data determination: A level is automatically switched thereto when data is found to comply with a specific value or condition. For example, a longer data string is about to be processed, and the data string has an ending of 0xFFFF. First, the burst mode controller 33 is programmed to switch to a higher level from a lower one prior to processing the longer data string. Next, the data transfer level returns to the original lower level when data has been detected to be at 0xFFFF. When processing a longer data string in which values of respective bytes in the longer data string have been processed with respect to an even parity in a parity check, an error is occurred when one of the detected bytes is not an even parity. As such, a processing of the longer data string has to be halted in order to enter into an error processing program. Hence, the burst mode controller 33 is programmed to switch to a higher level and an even parity is set as a check rule prior to processing the longer data string. Next, the data transfer level is decreased automatically for halting a process of the longer data string when one of the detected bytes does not comply with the even parity. Eventually, a lower level is performed in the error processing program.

Moreover, a combination of the above two determinations can be made if the above two kinds of data are mixed and checking rule is set. In a case that a longer data string is processed in which the data address is at 0x4000 to 0x4FFF and an even parity check is required, the burst mode controller 33 can be programmed to switch to a lower level when data is addressed beyond the range (i.e., from 0x4000 to 0x4FFF) or the even parity is found to be erroneous.

In addition, a threshold may be employed in conjunction with any of the determinations for avoiding an unnecessary level switching. That is, a level switching is actually performed when the number of determinations that are made to switch the level is larger than the threshold.

Figure 8:
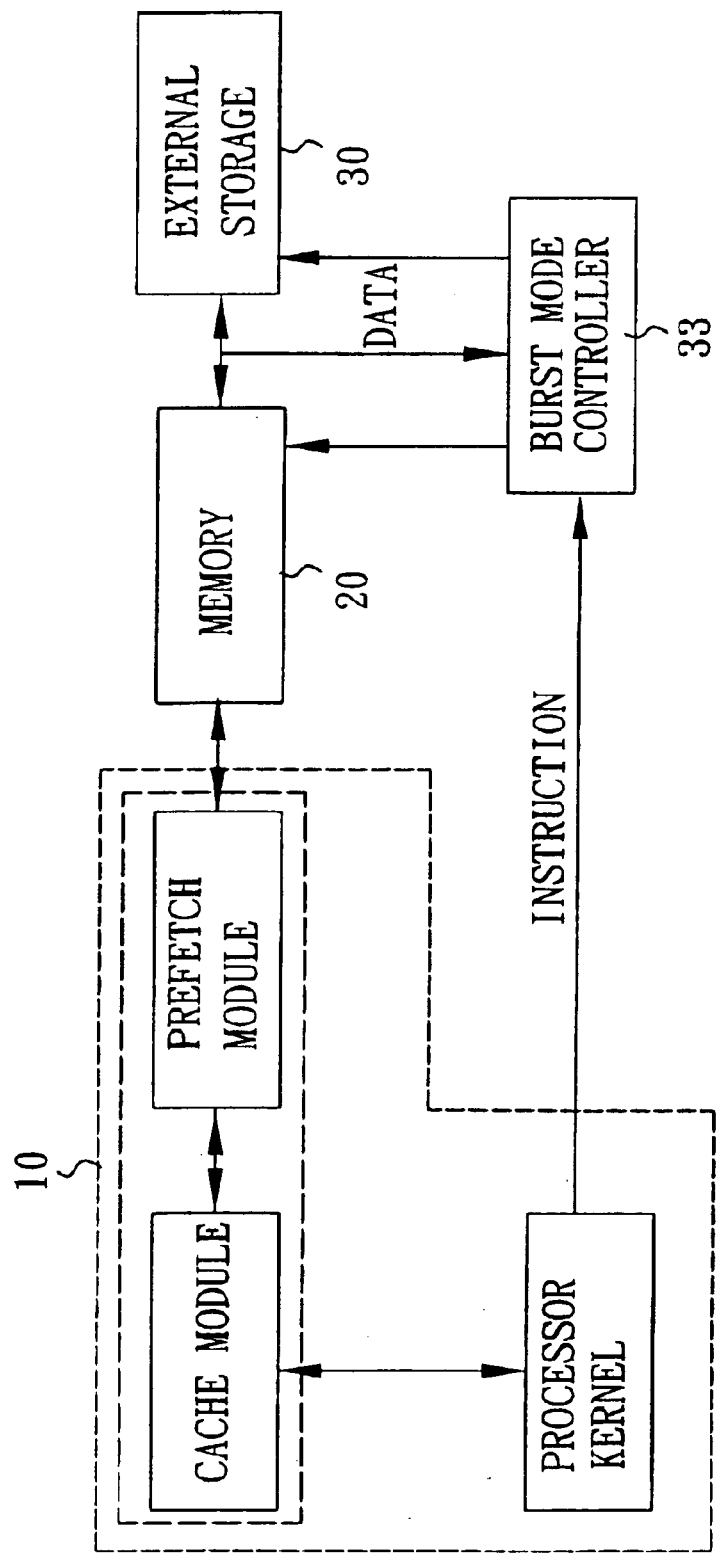
FIG. 8 presents schematically a second preferred embodiment of the architecture capable of programming and controlling access of data and instructions according to the invention.
Figure 9:
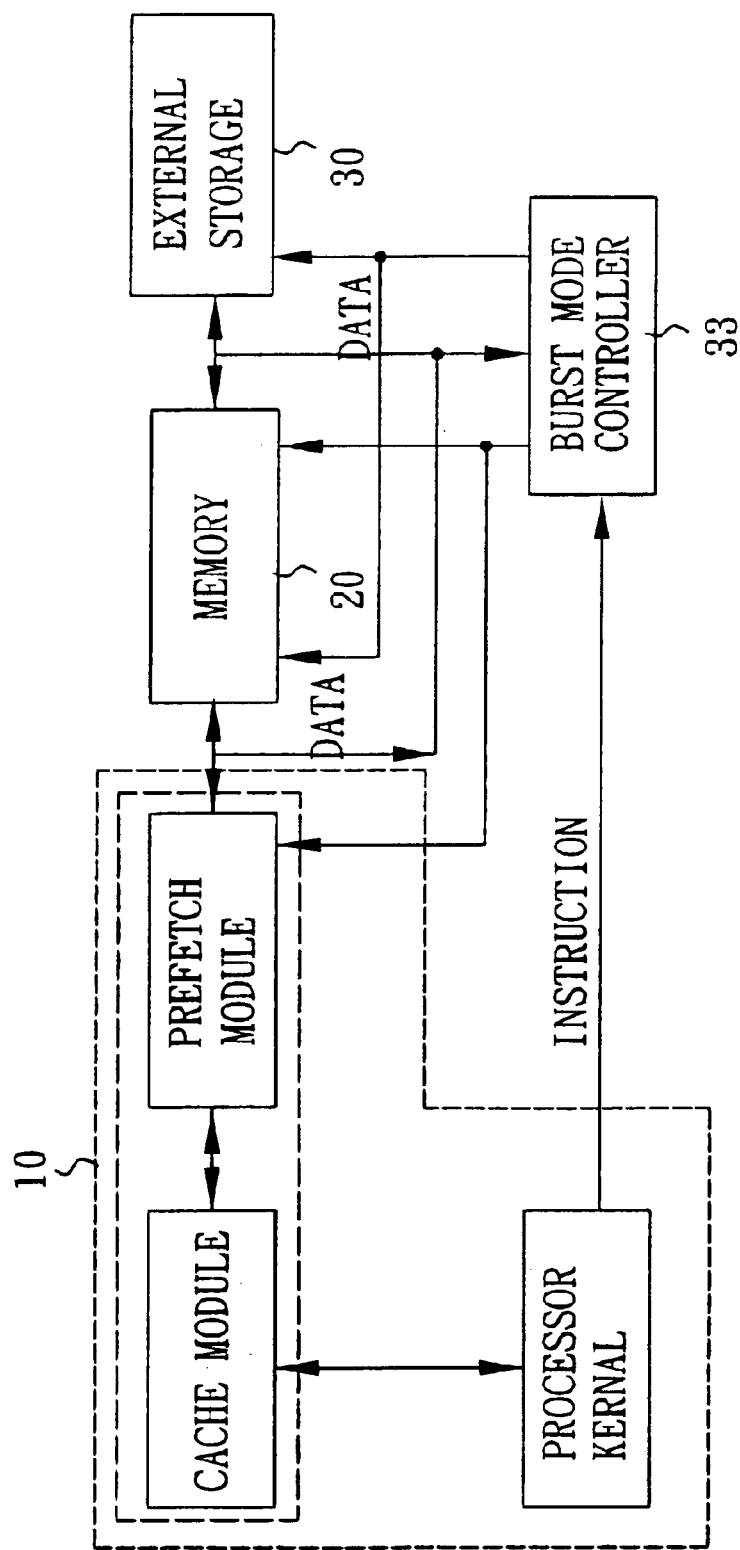
FIG. 9 presents schematically a third preferred embodiment of the architecture capable of programming and controlling access of data and instructions according to the invention.

The above preferred embodiment utilizes the first module (e.g., processor) 10 to program the burst mode controller 33 in order to control a data transfer between the first module 10 and the second module (e.g., memory device) 20. In the practical application, it is possible of utilizing the first module 10 to program the burst mode controller 33 to control a data transfer between any two modules in a computer system. With reference to FIG. 8, there is shown a second preferred embodiment of the invention in which the first module 10 is utilized to program the burst mode controller 33 to control a data transfer between the second and the third modules 20 and 30. The second module 20 is a memory device. The third module 30 is an external storage device or input/output (I/O) device. With reference to FIG. 9, there is shown a third preferred embodiment of the invention in which the first module 10 is utilized to program the burst mode controller 33 in order to control a data transfer between the first and the second modules 10 and 20 and between the second and the third modules 20 and 30. Control and data transfer of the burst mode controller 33 in either the second or the third embodiment is the same as that of the first embodiment. Thus, a detailed description thereof is omitted herein for the sake of brevity.

Figure 10:
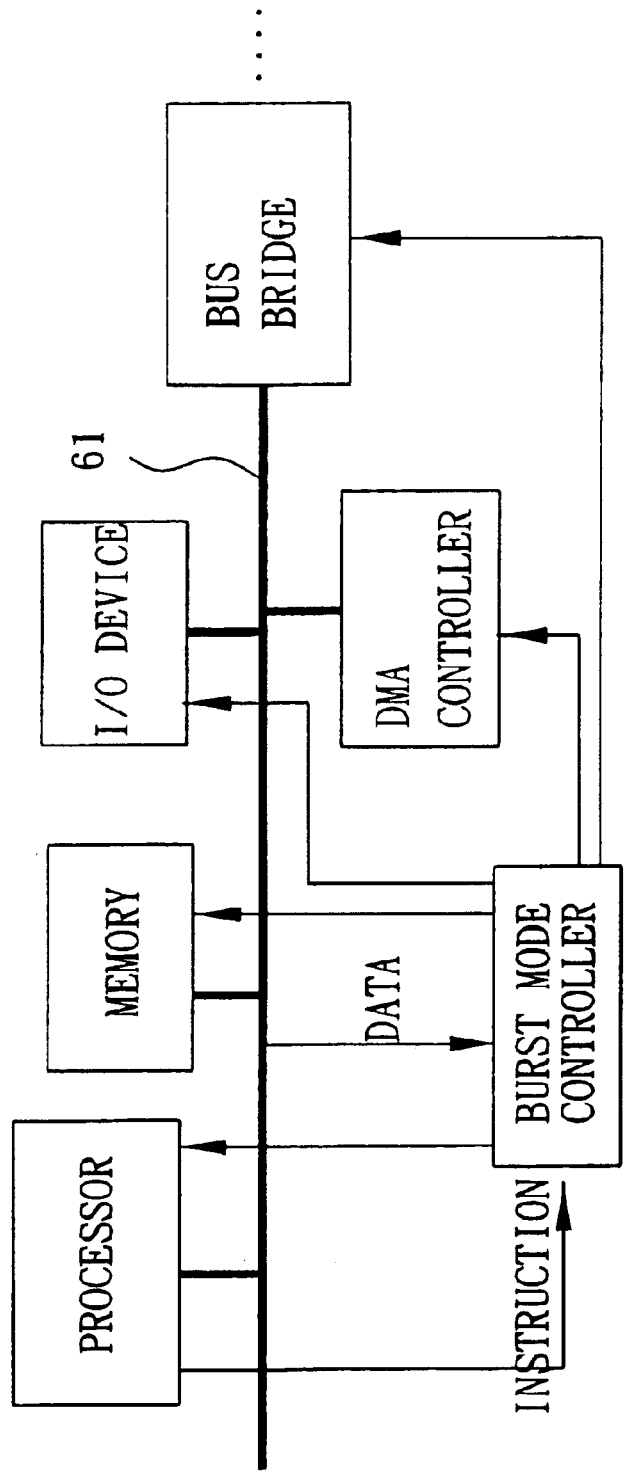
FIG. 10 presents schematically a fourth preferred embodiment of the architecture capable of programming and controlling access of data and instructions according to the invention.

Any of the above embodiments is described with respect to a programming of the burst mode controller 33 for controlling a data transfer between any two modules. It is appreciated that the burst mode controller 33 can be employed to control a data transfer via a bus. As shown in FIG. 10, a bus 61 is coupled to a plurality of modules such as a processor, a burst mode controller, an I/O device, a DMA controller, and a bus bridge. Similar to the above embodiments, the burst mode controller is programmed to control a data transfer between any two modules via the bus 61.

In brief, the invention controls a continuous data transfer mode based on data/instruction formats. Also, the invention can dynamically adjust the data transfer mode in running the computer system. As a result, an optimum performance of data transfer is obtained. Furthermore, a possibility of transferring unnecessary data is greatly reduced.

Although the present invention has been explained in relation to its preferred embodiment, it is to be understood that many other possible modifications and variations can be made without departing from the spirit and scope of the invention as hereinafter claimed.

What is claimed is:

1. An architecture capable of programming and controlling access of data and instructions, in which a plurality of data transfer levels are preset and a current data transfer level is used for accessing data and instructions, comprising:
    a first module capable of effecting a burst transfer for continuously outputting a data string having a fixed burst length for access;
    a second module for storing data and instructions, wherein each data transfer level corresponds to a length of a continuous data transfer via an interface between the first and the second modules; and
    a burst mode controller programmed by data format accessed by the first module or a result of instruction decoding performed by the first module, so as to adjust the current data transfer level,
    wherein the second module is a memory device and the first module comprises:
        a processor kernel capable of effecting a burst transfer for continuously sending or receiving a data string having a fixed burst length for access; and
        a high-speed access device for storing a portion of data and instructions sent from the second module, which is available for the processor kernel to access at a high speed, wherein each data transfer level corresponds to a length of a continuous data transfer via an interface between the second module and the high-speed access device,
    wherein the burst mode controller is programmed by at least one instruction in the instruction set of the processor kernel, and
    wherein the instruction has a command field for storing a command code of the burst mode controller, a level field for storing a numeral of the level, and a reference value field for storing a numeral associated with the command code.

2. The architecture as claimed in claim 1, wherein the burst mode controller is programmed by a control indication stored in one said field of the instruction of the processor kernel.

3. The architecture as claimed in claim 2, wherein said numeral of the level indicates the current data transfer level of the burst mode controller.

4. The architecture as claimed in claim 1, wherein the burst mode controller is programmed by a control indication embedded in said instruction of the processor kernel.

5. The architecture as claimed in claim 1, wherein the burst mode controller is determined to enter the current data transfer level based on an address region of data to be accessed by the processor kernel.

6. The architecture as claimed in claim 1, wherein the high-speed access device comprises a cache module and a prefetch module, and each data transfer level corresponds to a length of a continuous data transfer via an interface between the external memory device and the prefetch modules, and a length of a continuous data transfer via an interface between the cache and the prefetch modules.

7. The architecture as claimed in claim 1, further comprising a bus for transferring data between the first and the second modules.

8. An architecture capable of programming and controlling access of data and instructions, in which a plurality of data transfer levels are preset and a current data transfer level is used for accessing data and instructions, comprising:
    a first module capable of effecting a burst transfer for continuously outputting a data string having a fixed burst length for access;
    a second module for storing data and instructions, wherein each data transfer level corresponds to a length of a continuous data transfer via an interface between the first and the second modules; and
    a burst mode controller programmed by data format accessed by the first module or a result of instruction decoding performed by the first module, so as to adjust the current data transfer level,
    wherein the second module is a memory device and the first module comprises:
        a processor kernel capable of effecting a burst transfer for continuously sending or receiving a data string having a fixed burst length for access; and
        a high-speed access device for storing a portion of data and instructions sent from the second module, which is available for the processor kernel to access at a high speed, wherein each data transfer level corresponds to a length of a continuous data transfer via an interface between the second module and the high-speed access device, and
    wherein the burst mode controller is automatically switched to a specific data transfer level when data to be accessed by the processor kernel is found to comply with a predetermined value or condition.

9. The architecture as claimed in claim 8, wherein the burst mode controller is programmed by a control indication stored in one field of the instruction of the processor kernel.

10. The architecture as claimed in claim 9, wherein a numeral of the level is stored in a level field of the instruction for indicating the current data transfer level of the burst mode controller.

11. The architecture as claimed in claim 8, wherein the burst mode controller is programmed by a control indication embedded in an instruction of the processor kernel.

12. The architecture as claimed in claim 8, wherein the burst mode controller is determined to enter the current data transfer level based on an address region of data to be accessed by the processor kernel.

13. The architecture as claimed in claim 8, wherein the high-speed access device comprises a cache module and a prefetch module, and each data transfer level corresponds to a length of a continuous data transfer via an interface between the external memory device and the prefetch modules, and a length of a continuous data transfer via an interface between the cache and the prefetch modules.

14. The architecture as claimed in claim 8, further comprising a bus for transferring data between the first and second modules.

* * * * *